United States Patent
Rollag et al.

(10) Patent No.: US 11,158,871 B2
(45) Date of Patent: Oct. 26, 2021

(54) FUEL CELL ASSEMBLY AND A VEHICLE THAT UTILIZES THE FUEL CELL ASSEMBLY

(71) Applicant: GM Global Technology Operations LLC, Detroit, MI (US)

(72) Inventors: Kelsey M. Rollag, Pontiac, MI (US); Balasubramanian Lakshmanan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 16/038,754

(22) Filed: Jul. 18, 2018

(65) Prior Publication Data
US 2020/0028189 A1   Jan. 23, 2020

(51) Int. Cl.
*H01M 8/04089*   (2016.01)
*H01M 8/04746*   (2016.01)
*H01M 16/00*   (2006.01)
*B60L 50/72*   (2019.01)

(52) U.S. Cl.
CPC ......... *H01M 8/04089* (2013.01); *B60L 50/72* (2019.02); *H01M 8/04753* (2013.01); *H01M 8/04776* (2013.01); *H01M 16/006* (2013.01); *B60L 2250/26* (2013.01); *H01M 2220/20* (2013.01); *H01M 2250/20* (2013.01)

(58) Field of Classification Search
CPC ......... H01M 8/04089; H01M 8/04753; H01M 8/04776; H01M 16/006; B60L 50/72
See application file for complete search history.

(56) References Cited

U.S. PATENT DOCUMENTS

| | | | |
|---|---|---|---|
| 2002/0012826 A1* | 1/2002 | Sohmer ............ | H01M 8/04089 429/452 |
| 2006/0051649 A1* | 3/2006 | Jeon .................... | H01M 8/0662 429/410 |
| 2007/0072021 A1* | 3/2007 | Taniguchi ................. | F02C 6/12 429/408 |
| 2008/0026264 A1 | 1/2008 | Watanabe | |

\* cited by examiner

*Primary Examiner* — Helen Oi K Conley
(74) *Attorney, Agent, or Firm* — Quinn IP Law

(57) ABSTRACT

A fuel cell assembly includes a fuel cell stack. A vehicle includes a propulsion system and the fuel cell assembly configured to provide power to the propulsion system in at least one mode. The fuel cell assembly also includes an air compressor and an air pump spaced from the air compressor. The air compressor includes an on position in which the air compressor is configured to supply air to the fuel cell stack and an off position in which the air compressor does not supply air to the fuel cell stack. The air compressor also includes a bearing configured to be levitated via air. The air pump is configured to supply air to the fuel cell stack when the air compressor is in the off position and configured to supply air to the bearing when the air compressor is in the on position.

20 Claims, 2 Drawing Sheets

FUEL CELL ASSEMBLY AND A VEHICLE THAT UTILIZES THE FUEL CELL ASSEMBLY

INTRODUCTION

A fuel cell stack is an electrochemical device that uses platinum or another suitable catalyst to produce electricity from a paired oxidation/reduction reaction. Fuel cell stacks may be used as a source of direct current electrical power for motor vehicle propulsion, power generation, and other beneficial applications. In motor vehicle applications in particular, the period between turning an ignition on at the onset of a trip and turning the ignition off again upon trip completion is referred to as a vehicle drive cycle. In a vehicle using a fuel cell stack, a large portion of the drive cycle may be spent idling with the fuel cell stack operating at low power output levels, with the fuel cell stack remaining at a fixed voltage level with a very low current draw. This low power/idling period is referred to as "hold time".

SUMMARY

The present disclosure provides a fuel cell assembly including a fuel cell stack. The fuel cell assembly also includes an air compressor and an air pump spaced from the air compressor. The air compressor includes an on position in which the air compressor is configured to supply air to the fuel cell stack and an off position in which the air compressor does not supply air to the fuel cell stack. The air compressor also includes a bearing configured to be levitated via air. The air pump is configured to supply air to the fuel cell stack when the air compressor is in the off position and configured to supply air to the bearing when the air compressor is in the on position.

The fuel cell assembly optionally includes one or more of the following:

A) the air compressor operates at a first voltage and the air compressor is in electrical communication with the fuel cell stack;

B) the air pump operates at a second voltage different from the first voltage;

C) a battery in electrical communication with the air pump and the battery is configured to provide the second voltage to the air pump;

D) the air compressor is operable at a high voltage via the fuel cell stack, and the air pump is operable at a low voltage via the battery, and wherein the first voltage is defined as the high voltage and the second voltage is defined as the low voltage, and wherein the high voltage is greater than the low voltage;

E) the second voltage is about 12 volts to about 59 volts, and the first voltage is equal to or greater than 60 volts;

F) a valve disposed between the air pump and the fuel cell stack, and the valve is disposed between the air pump and the bearing of the air compressor;

G) a plurality of pathways configured to guide the air, and wherein the valve includes a plurality of positions to open and close the pathways to at least one of the fuel cell stack and the bearing;

H) the valve is in a first position which allows the air pump to supply air to the fuel cell stack when the air compressor is in the off position;

I) the first position of the valve opens one of the pathways between the air pump and the fuel cell stack, and closes another one of the pathways between the air pump and the bearing;

J) the valve is in a second position which allows the air pump to supply air to the bearing of the air compressor when the air compressor is in the on position;

K) the second position of the valve opens the pathway between the air pump and the bearing, and closes the pathway between the air pump and the fuel cell stack;

L) the valve is in a third position which allows the air pump to supply air to both the fuel cell stack and the bearing of the air compressor when the air compressor switches between the off position and the on position;

M) the third position of the valve opens the pathway between the air pump and the bearing, and opens the pathway between the air pump and the fuel cell stack;

N) the air compressor includes a motor and a shaft rotatable during operation of the motor;

O) the bearing supports the shaft;

P) a filter configured to filter the air directed toward the air pump and the air compressor;

Q) a silencer disposed between the filter and the air pump, and the silencer is disposed between the filter and the air compressor;

R) the fuel cell stack is disposed downstream from the air pump and the air compressor, and the fuel cell stack includes fuel cells arranged between respective anode and cathode plates;

S) the air compressor operates at a high voltage, and the air compressor is in electrical communication with the fuel cell stack;

T) the air pump operates at a low voltage different from the high voltage;

U) a battery in electrical communication with the air pump and the battery is configured to provide the low voltage to the air pump; and V) a valve disposed upstream from the fuel cell stack.

The present disclosure also provides a vehicle including a propulsion system and a fuel cell assembly configured to provide power to the propulsion system in at least one mode. The fuel cell assembly includes a fuel cell stack and an air compressor. The air compressor includes an on position in which the air compressor is configured to supply air to the fuel cell stack and an off position in which the air compressor does not supply air to the fuel cell stack. The air compressor includes a bearing configured to be levitated via air. The fuel cell assembly further includes an air pump spaced from the air compressor and configured to supply air to the fuel cell stack when the air compressor is in the off position and configured to supply air to the bearing when the air compressor is in the on position.

The vehicle optionally includes one or more of the following:

A) the air compressor is in the on position to supply air to the fuel cell stack when the fuel cell assembly is in a first power operation mode;

B) the air pump is configured to supply air to the fuel cell stack when the fuel cell assembly is in a second power operation mode;

C) the second power operation mode utilizes less power than the first power operation mode, and the air compressor is in the off position when the fuel cell assembly is in the second power operation mode;

D) an accelerator configured to communicate with the propulsion system an amount of acceleration to propel the vehicle;

E) the fuel cell assembly is in the first power operation mode when a first threshold of the amount of acceleration is reached;

F) the fuel cell assembly is in the second power operation mode during idling of the propulsion system;

G) the fuel cell assembly is in the second power operation mode when less than ten percent of the power of the fuel cell assembly is being utilized;

H) the air compressor operates at a first voltage and the air compressor is in electrical communication with the fuel cell stack;

I) the air pump operates at a second voltage different from the first voltage;

J) the fuel cell assembly further includes a battery in electrical communication with the air pump and the battery is configured to provide the second voltage to the air pump;

K) the fuel cell assembly further includes a valve disposed between the air pump and the fuel cell stack, and the valve is disposed between the air pump and the bearing of the air compressor;

L) the fuel cell assembly further includes a plurality of pathways configured to guide the air;

M) the valve includes a plurality of positions to open and close the pathways to at least one of the fuel cell stack and the bearing;

N) the valve is in a first position which allows the air pump to supply air to the fuel cell stack when the air compressor is in the off position;

O) the first position of the valve opens one of the pathways between the air pump and the fuel cell stack, and closes another one of the pathways between the air pump and the bearing;

P) the valve is in a second position which allows the air pump to supply air to the bearing of the air compressor when the air compressor is in the on position; and Q) the second position of the valve opens the pathway between the air pump and the bearing, and closes the pathway between the air pump and the fuel cell stack.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
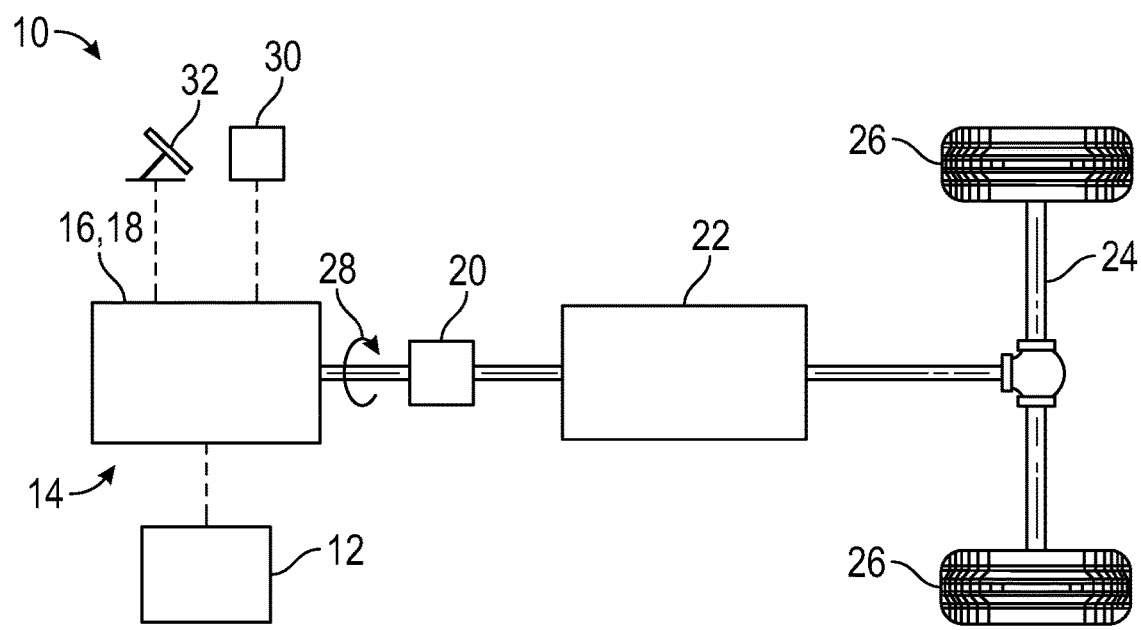
FIG. 1 is a schematic illustration of a vehicle and a fuel cell assembly.

Referring to the FIGS., wherein like numerals indicate like or corresponding parts throughout the several views, a vehicle 10 and a fuel cell assembly 12 are generally shown in FIG. 1.

The fuel cell assembly 12 can be of a type adaptable for use as a direct current (DC) power supply in the vehicle 10, for instance a motor vehicle as shown, or marine vehicle, aerospace vehicle, robot, farm equipment or other movable platform. The fuel cell assembly 12 can also be used in a stationary power plant or other system requiring onboard generation of DC power. For illustrative consistency, the fuel cell assembly 12 will be described hereinafter in the context of a propulsion function aboard the vehicle 10 without limiting the fuel cell assembly 12 to such applications.

In the vehicle application, the vehicle 10 can include a propulsion system 14 (see FIG. 1) and the fuel cell assembly 12. The propulsion system 14 can include the components that propel the vehicle 10. Non-limiting examples of at least some of the components of the propulsion system 14 include one or more of an engine 16, an electric machine 18, e.g., a traction motor, a crankshaft, a final drive, a torque converter 20, a transmission 22, a differential, a drive axle 24, and wheels 26. Output torque 28 from the engine 16/the electric machine 18 can be delivered to an output member to perform work aboard the vehicle 10 or other system.

Continuing with the vehicle application, the vehicle 10 can include an ignition 30 (see FIG. 1) in communication with the propulsion system 14. The ignition 30 can be configured to turn on the propulsion system 14. In other words, the ignition 30 can turn on the vehicle 10 and can turn off the vehicle 10. As non-limiting examples, the ignition 30 can turn the vehicle 10 on via a push button, a key, a fob, etc.

For example, when the ignition 30 turns on the vehicle 10, the fuel cell assembly 12 can be in a first power operation mode. Turning the vehicle 10 on generally requires higher power to start up the propulsion system 14. Therefore, the first power operation mode can also be referred to as a high-power operating mode. The high-power operating mode can include other parameters besides start up, some of which are discussed below. Generally, the high-power operating mode can be present for approximately twenty percent (20%) or less of the operating time of the vehicle 10.

As another example, after the vehicle 10 has been turned on and when the vehicle 10 is idling (idling can occur, for example, when the vehicle 10 is stationary at a traffic light), the fuel cell assembly 12 is in a second power operation mode. Idling of the vehicle 10 generally requires low power, i.e., lower power than turning on the vehicle 10. Therefore, the second power operation mode can also be referred to as a low-power operating mode. The low-power operating mode can occur when the vehicle 10 requires less power than the high-power operating mode. The low-power operating mode can include other parameters besides idling. Generally, the low-power operating mode can be present for approximately eighty percent (80%) or more of the operating time of the vehicle 10.

Furthermore, in the vehicle application, the vehicle 10 can include an actuator or an accelerator 32, e.g. pedal, (see FIG. 1) configured to communicate with the propulsion system 14 an amount of acceleration to propel the vehicle 10. For example, in the vehicle application, after the vehicle 10 is turned on via the ignition 30 or stationary at a traffic light, a driver of the vehicle 10 can then press the accelerator 32 which causes the vehicle 10 to accelerate or propel in a direction. Depending on the amount of acceleration, the vehicle 10 can be in the first power operation mode or the high-power operating mode. For example, if a large amount of acceleration or fast acceleration is desired, the vehicle 10 can be in the first power operation mode or the high-power operating mode.

The fuel cell assembly 12 can be configured to provide power to the propulsion system 14 in at least one mode. For example, when the propulsion system 14 includes at least one electric machine 18, the fuel cell assembly 12 can be utilized to provide power to the electric machine 18. The at least one mode can include the high-power operating mode discussed above.

Figure 2:
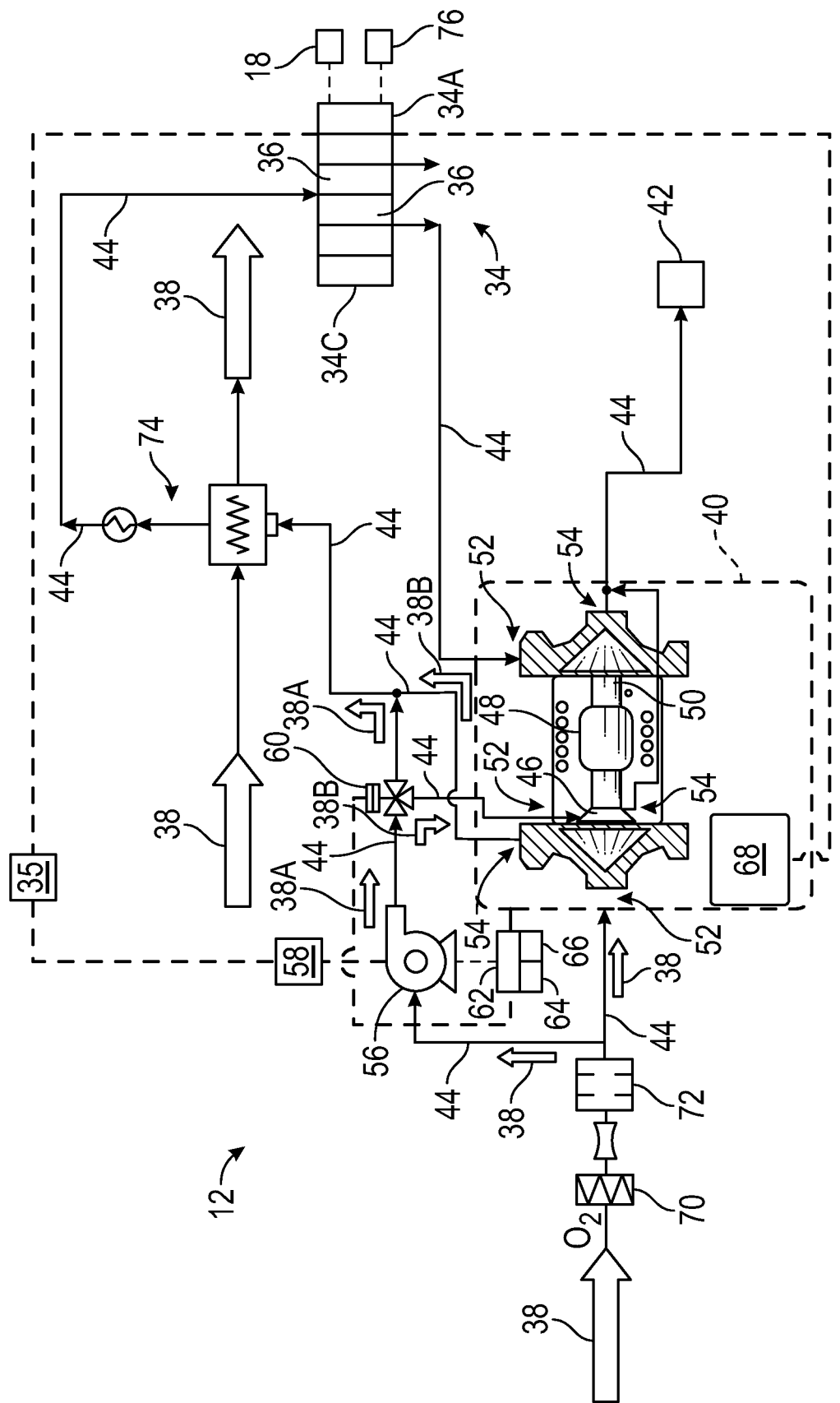
FIG. 2 is a schematic illustration of the fuel cell assembly that can be utilized in the vehicle of FIG. 1.

Referring to FIG. 2, the fuel cell assembly 12 includes a power source, such as a fuel cell stack 34, which can be of a type adaptable for use as the DC power supply. The fuel cell stack 34 can supply power to components that require high voltage, as well as, components that require low voltage by also using a converter 35, such as a DC/DC converter, etc., to decrease a DC voltage level from the fuel cell stack 34 to a lower level suitable for energizing various components connected thereto.

The fuel cell stack 34 can include fuel cells 36 arranged between respective anode and cathode plates 34A, 34C. While the particular type of fuel cell stack 34 and the constituent fuel cells 36 can vary with the application of the fuel cell assembly 12, in an example configuration the fuel cells 36 can be a polymer electrolyte membrane/proton exchange membrane (PEM)-type in order to deliver a relatively high power density with low weight and volume. PEM-type fuel cells use a catalyst in the form of platinum or platinum alloy and a solid electrolyte polymer material. Thus, the oxides noted above can form on the platinum/platinum alloy materials in such an embodiment, ultimately reducing stack voltage. The fuel cells 36, when configured as PEM-type fuel cells, operate using a supply of gaseous hydrogen from a hydrogen storage tank and a supply of oxygen ($O_2$) supplied from air 38 (see arrow 38 in FIG. 2), such as ambient air 38, via an air compressor 40, or via an oxygen storage tank. The air 38 sent through the fuel cell stack 34 is eventually vented from the fuel cell stack 34 via an exhaust 42.

The fuel cell assembly 12 can further include a plurality of pathways 44 configured to guide the air 38. One or more pathways 44 can be utilized to direct the air 38 into the fuel cell stack 34, through the fuel cell stack 34 and out of the fuel cell stack 34 to the exhaust 42.

Turning back to the air compressor 40 as best shown in FIG. 2, the fuel cell assembly 12 includes the air compressor 40 referred to above. Generally, the air compressor 40 is in electrical communication with the fuel cell stack 34. The air compressor 40 includes an on position in which the air compressor 40 is configured to supply air 38 to the fuel cell stack 34 and an off position in which the air compressor 40 does not supply air 38 to the fuel cell stack 34. For example, the air compressor 40 can be in the on position to supply air 38 to the fuel cell stack 34 when the fuel cell assembly 12 is in the first power operation mode. In certain embodiments, the fuel cell assembly 12 is in the first power operation mode when the ignition 30 is turning on the propulsion system 14 or when a first threshold of the amount of acceleration is reached. Said differently, the air compressor 40 can be operated to supply air 38 to the fuel cell stack 34 when high power is needed, i.e., the high-power operating mode.

Continuing with FIG. 2, the air compressor 40 includes a bearing 46 configured to be levitated via the air 38. As such, some of the air 38 that enters the fuel cell assembly 12 can be directed to the bearing 46 to levitate the bearing 46. The bearing 46 can be referred to as an air bearing.

The air compressor 40 can further include a motor 48 and a shaft 50 rotatable during operation of the motor 48. Generally, the bearing 46 supports the shaft 50. When the air compressor 40 is in the on position, the motor 48 of the air compressor 40 can operate to rotate the shaft 50 and direct some of the air 38 from the air compressor 40 to the fuel cell stack 34. The air compressor 40 can also include one or more inlets 52 to let air 38 into the air compressor 40 and one or more outlets 54 to expel the air 38 from the fuel cell stack 34 out to the exhaust 42.

The air compressor 40 can operate at a first voltage. In certain embodiments, the air compressor 40 can operate at a high voltage. The power supply is in electrical communication with the air compressor 40 to provide the first voltage to operate the air compressor 40. Non-limiting examples of the power supply can include a battery, such as a high-voltage battery, the fuel cell stack 34, etc. Therefore, in certain configurations, the fuel cell stack 34 can be configured to provide the first voltage/the high voltage to the air compressor 40 (instead of using the high-voltage battery). Hence, the air compressor 40 can be operable at the high voltage via the fuel cell stack 34. In this configuration, the fuel cell stack 34 is in electrical communication with the air compressor 40 to operate the motor 48 of the air compressor 40 to direct the air 38 toward the fuel cell stack 34 when the first power operation mode is utilized.

In other configurations, the high-voltage battery can be configured to provide the first voltage/the high voltage to the air compressor 40, and the fuel cell stack 34 is used to charge the high-voltage battery. Hence, the air compressor 40 can be operable at the high voltage via the high-voltage battery. In this configuration, the high-voltage battery is in electrical communication with the air compressor 40 to operate the motor 48 of the air compressor 40 to direct the air 38 toward the fuel cell stack 34 when the first power operation mode is utilized. Additionally, the high-voltage battery is in electrical communication with the fuel cell stack 34 to charge the high-voltage battery.

The first voltage can be defined as the high voltage. In certain embodiments, the first voltage is equal to or greater than 60 volts. Hence, the air compressor 40 can operate if, for example, the fuel cell stack or the high-voltage battery supplies 60 volts or greater than 60 volts to the air compressor 40.

The air compressor 40 generally operates more efficiently in the first power operation mode or the high-power operating mode. If the air compressor 40 operates during the second power operation mode or the low-power operating mode, the air compressor 40 does not operate as efficiently as in the first power operation mode. Therefore, it is desired to minimize operation of the air compressor 40 during the second power operation mode to increase the power usage efficiency of the fuel cell assembly 12. Furthermore, the power usage efficiency of the fuel cell assembly 12 can be increased during the high-power operating mode, which is discussed further below.

To increase usage efficiency, the fuel cell assembly 12 includes an air pump 56 (see FIG. 2). Generally, the air pump 56 is spaced from the air compressor 40. Furthermore, generally, the fuel cell stack 34 can be disposed downstream from the air pump 56 and the air compressor 40 (relative to the direction of the arrow indicating the air 38).

The air pump 56 operates at a lower voltage than the air compressor 40, and thus, less power is needed to operate the air pump 56 as compared to the air compressor 40. The air pump 56 increases the power usage efficiency via reducing the use of the air compressor 40 which requires more power to operate, and power can be wasted if the air compressor 40 has to operate at the low-power operating mode. Additionally, the air pump 56 can increase the power usage efficiency via reducing the use of the air compressor 40 during the high-power operating mode. Simply stated, by using the air pump 56, the air compressor 40 can be shut off, i.e., provide no air 38, during the low-power operating mode, and the air compressor 40 can be turned on, but provide less air 38 (lower air flow) during the high-power operating mode.

The air pump 56 is configured to supply air 38 (air flow) to the fuel cell stack 34 when the air compressor 40 is in the off position and configured to supply air 38 to the bearing 46 when the air compressor 40 is in the on position. Therefore, the air pump 56 can supply the air 38 to the fuel cell stack 34 when low power is required (such as when the vehicle 10 is idling), and thus, the air compressor 40 does not have to provide this air 38 during low power requirements, i.e., then the air compressor 40 is turned off. If the air compressor 40 had to supply air 38 to both the bearing 46 and the fuel cell stack 34, excess power consumption would be required to operate the air compressor 40 to deliver air 38 to both the bearing 46 and the fuel cell stack 34 during the low-power operating mode (higher or larger air flow would be needed via the air compressor 40 to supply the required air 38 to both the bearing 46 and the fuel cell stack 34), and hence, power would be wasted.

Furthermore, the air pump 56 can supply the air 38 to the bearing 46 when the air compressor 40 operates to supply air 38 to the fuel cell stack 34, which can be during the high-power operating mode. As such, the air compressor 40 does not have to deliver as much air 38 (lower air flow) through the system because the air pump 56 is being utilized to supply the air 38 to the bearing 46 instead of the air compressor 40. If the air compressor 40 had to supply air 38 to both the bearing 46 and the fuel cell stack 34, excess power consumption would be required to operate the air compressor 40 to deliver air 38 to both the bearing 46 and the fuel cell stack 34 during the high-power operating mode (higher or larger air flow would be needed via the air compressor 40 to supply the required air 38 to both the bearing 46 and the fuel cell stack 34), and hence, power would be wasted.

Figure 3:
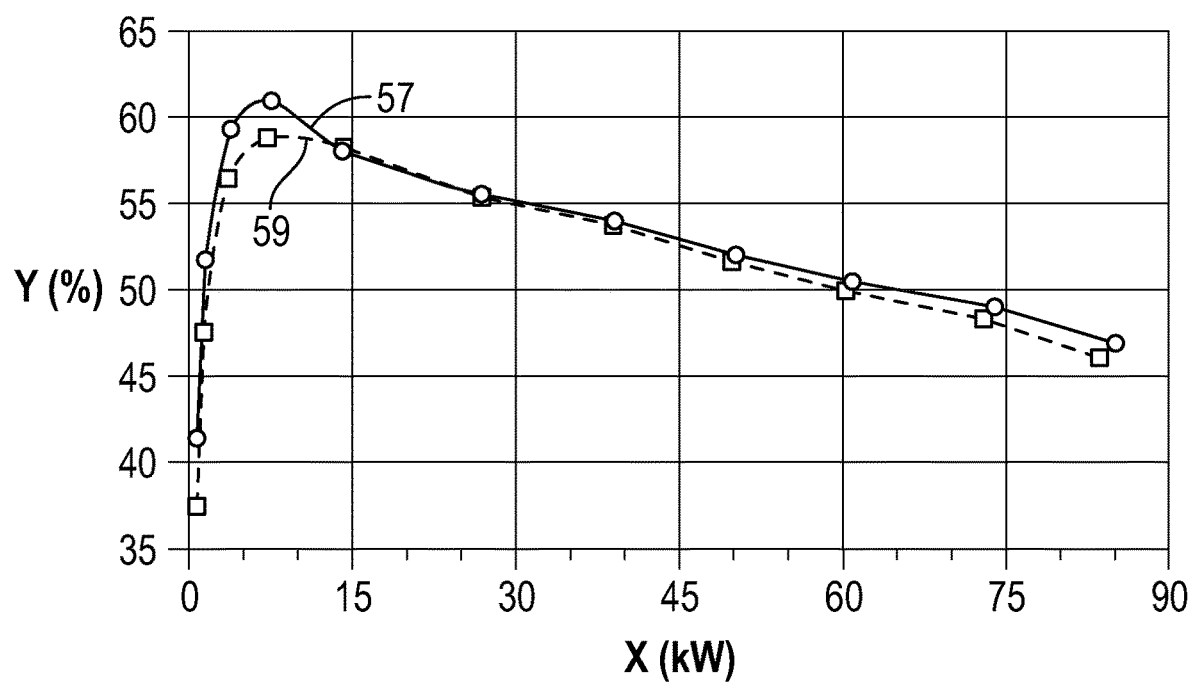
FIG. 3 is a schematic graph illustration of percent verse kilowatt.

As shown in FIG. 3, the fuel cell assembly 12 efficiency (Y) is shown as compared to the fuel cell assembly 12 net power (X). The solid line 57 indicates the fuel cell assembly 12 with both the air compressor 40 and the air pump 56. The evenly dashed line 59 indicates a fuel cell assembly without the air pump 56. As shown in FIG. 3, at low net power, the fuel cell assembly 12 is more efficient than without the air pump 56 (for example, see the net power at about 2 kilowatt to about 11 kilowatt) because the air pump 56 requires less power to operate to deliver the air 38 to the fuel cell stack 34 as compared to if the air compressor 40 had to operate. Additionally, as shown in FIG. 3, at high net power, the fuel cell assembly 12 is also more efficient than without the air pump 56 (for example, see the net power at about 70 kilowatt to about 85 kilowatt) because the air pump 56 requires less power to operate to deliver the air 38 to the bearing 46 as compared to if the air compressor 40 had to also deliver the air 38 to the bearing 46.

Therefore, the air pump 56 can be configured to supply the air 38 to the fuel cell stack 34 when the fuel cell assembly 12 is in the second power operation mode, and supply the air 38 to the bearing 46 when the fuel cell assembly 12 is in the first power operation mode. Generally, the second power operation mode utilizes less power than the first power operation mode. The air compressor 40 is in the off position when the fuel cell assembly 12 is in the second power operation mode. For example, in certain embodiments, the fuel cell assembly 12 is in the second power operation mode during idling of the propulsion system 14. Furthermore, in certain embodiments, the fuel cell assembly 12 can be in the second power operation mode when less than ten percent (10%) of the power of the fuel cell assembly 12 is being utilized. For example, when less than 8 kilowatts of power is being utilized, the fuel cell assembly 12 can be in the second power operation mode.

The air pump 56 can operate at a second voltage different from the first voltage. In certain embodiments, the air pump 56 can operate at a low voltage different from the high voltage. Generally, the high voltage is greater than the low voltage. The second voltage can be defined as the low voltage. Turning back to FIG. 2, the fuel cell assembly 12 can also include a battery 58 in electrical communication with the air pump 56. The battery 58 can be configured to provide the low voltage/the second voltage to the air pump 56. In certain embodiments, the second voltage is about 12 volts to about 59 volts, and thus, the battery 58 can be of a corresponding size (such as, for example, 12 volts, 48 volts, or any voltage from about 12 volts to less than 60 volts) to supply the power to the air pump 56. Generally, the battery 58 utilized via the air pump 56 is a low-voltage battery. The fuel cell stack 34 is in electrical communication with the battery 58 to charge the battery 58. Furthermore, the converter 35 is electrically disposed between the fuel cell stack 34 and the battery 58 to lower the DC level to charge the battery 58.

Again, continuing with FIG. 2, the fuel cell assembly 12 can also include a valve 60 disposed between the air pump 56 and the fuel cell stack 34, and the valve 60 can be disposed between the air pump 56 and the bearing 46 of the air compressor 40. Generally, the valve 60 can be disposed upstream from the fuel cell stack 34 and can be utilized to direct the air 38 to desired component(s), such as the fuel cell stack 34 or the bearing 46.

The valve 60 can include a plurality of positions to open and close the pathways 44 to at least one of the fuel cell stack 34 and the bearing 46. Generally, at least one of the fuel cell stack 34 and the bearing 46 can include the fuel cell stack 34 and/or the bearing 46 as discussed below with the different positions.

The valve 60 can be in a first position which allows the air pump 56 to supply air 38 to the fuel cell stack 34 when the air compressor 40 is in the off position. The first position of the valve 60 can open one of the pathways, i.e., a first pathway, 44A between the air pump 56 and the fuel cell stack 34, and can close another one of the pathways, i.e., a second pathway, 44B between the air pump 56 and the bearing 46. Therefore, as identified with arrow 38A, the air 38 is directed from the air pump 56 through the valve 60 to the fuel cell stack 34 while bypassing the air compressor 40. When the valve 60 is in the first position, the air compressor 40 does not send air 38 directly to the fuel cell stack 34, and instead, the air pump 56 is responsible for sending air 38 to the fuel cell stack 34.

The valve 60 can be in a second position which allows the air pump 56 to supply air 38 to the bearing 46 of the air compressor 40 when the air compressor 40 is in the on position. The second position of the valve 60 can open the pathway, i.e., the second pathway, 44B between the air pump 56 and the bearing 46, and can close the pathway, i.e., the first pathway, 44A between the air pump 56 and the fuel cell stack 34. Therefore, as identified with arrows 38B, some of the air 38 is directed from the air pump 56 to the bearing 46 of the air compressor 40, and the air compressor 40 (not the air pump 56) supplies some air 38 to the fuel cell stack 34. Simply stated, when the valve 60 is in the second position, the air pump 56 does not send air 38 to the fuel cell stack 34, and instead, the air compressor 40 is responsible for sending air 38 to the fuel cell stack 34.

In certain embodiments, the valve 60 can be in a third position which allows the air pump 56 to supply air 38 to both the fuel cell stack 34 and the bearing 46 of the air compressor 40 when the air compressor 40 switches between the off position and the on position. The third position of the valve 60 can open the pathway, i.e., the second pathway, 44B between the air pump 56 and the bearing 46, and can open the pathway, i.e., the first pathway, 44A between the air pump 56 and the fuel cell stack 34. This third position can be referred to as a transition position, when the fuel cell assembly 12 is switching between low power to high power, or vice versa. Therefore, some of the air 38 is directed from the air pump 56 through the valve 60 along arrow 38B to the bearing 46 of the air compressor 40 and some of the air 38 is directed from the air pump 56 through the valve 60 along arrow 38A to the fuel cell stack 34, and additionally, some of the air 38 is directed from the air compressor 40 to the fuel cell stack 34 along arrow 38B.

The fuel cell assembly 12 can also include a controller 62 programmed with instructions to control the valve 60, the air pump 56 and/or the air compressor 40. Furthermore, the controller 62 can be programmed with instructions to communicate with the fuel cell stack 34 and one or more of the power source and/or the battery 58. As such, the controller 62 can signal to fuel cell stack 34 to provide power to various components of the vehicle 10, such as power to operate the air compressor 40 and/or power to charge the battery 58 of the air pump 56 etc. As such, the controller 62 can be in electrical communication with the valve 60, the air pump 56, the air compressor 40 and/or the fuel cell stack 34. Instructions can be stored in a memory 64 of the controller 62 and automatically executed via a processor 66 of the controller 62 to provide the respective control functionality.

The controller 62 is configured to execute the instructions from the memory 64, via the processor 66. For example, the controller 62 can be a host machine or distributed system, e.g., a computer such as a digital computer or microcomputer, and, as the memory 64, tangible, non-transitory computer-readable memory such as read-only memory (ROM) or flash memory. The controller 62 can also have random access memory (RAM), electrically erasable programmable read-only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 62 can include all software, hardware, memory 64, algorithms, connections, sensors, etc., necessary to control, for example, the valve 60, the air pump 56 and/or the air compressor 40. As such, a control method operative to control the valve 60, the air pump 56, the air compressor 40 and/or the fuel cell stack 34 can be embodied as software or firmware associated with the controller 62. It is to be appreciated that the controller 62 can also include any device capable of analyzing data from various sensors, comparing data, making the necessary decisions required to control and/or monitor the valve 60, the air pump 56, the air compressor 40 and/or the fuel cell stack 34. Optionally, more than one controller 62 can be utilized.

The air compressor 40 can include other components not discussed herein or briefly discussed in this paragraph. For example, the air compressor 40 can include a compressor power inverter module (CPIM) 68 in electrical communication with various components of the air compressor 40 and can be in communication with the controller 62. The CPIM 68 can be configured to convert DC current from the fuel cell stack 34 to an alternating current (AC) to operate the air compressor 40.

The fuel cell assembly 12 can include additional components not discussed herein or briefly discussed below.

Continuing with FIG. 2, the fuel cell assembly 12 can further include a filter 70 configured to filter the air 38 upstream from the fuel cell stack 34 relative to the direction of the arrow indicating the air 38. Hence, the filter 70 can be configured to filter the air 38 directed toward the air pump 56 and the air compressor 40. The air pump 56 and the air compressor 40 are spaced from the filter 70.

Furthermore, the fuel cell assembly 12 can optionally include a silencer 72 disposed upstream from the fuel cell stack 34 relative to the direction of the arrow indicating the air 38. In certain embodiments, the silencer 72 can be disposed between the filter 70 and the air pump 56. Furthermore, in certain embodiments, the silencer 72 can be disposed between the filter 70 and the air compressor 40. The air pump 56 and the air compressor 40 are spaced from the silencer 72. As shown in FIG. 2, the silencer 72 can generally be disposed between the filter 70 and the air compressor 40. The silencer 72 can be configured to reduce noise in the fuel cell assembly 12.

Additionally, the fuel cell assembly 12 can include an air cooler 74 or heat exchanger configured to change the temperature of the air 38 before reaching the fuel cell stack 34. Optionally, some air 38 can be fed directly into and out of the air cooler 74. For example, if the air 38 directed to the fuel cell stack 34 is too warm, the air cooler 74/the heat exchanger can cool the air 38 to the desired temperature for the fuel cell stack 34. Furthermore, by having the air pump 56 supply the air 38 to the bearing, the air 38 does not have to be directed through the air cooler 74 first to achieve the desired air temperature. If the air compressor 40 had to supply the air 38 to the bearing 46, then the air 38 would have to be directed through the air cooler 74 first to achieve the desired air temperature before reaching the bearing 46 of the air compressor 40. Hence, additional pathways 44 can be eliminated by utilizing the air pump 56. Furthermore, the air compressor 40 does not have to supply the air 38 to the bearing 46 by utilizing the air pump 56.

The fuel cell assembly 12 can include a high-voltage battery 76 (see FIG. 2) in electrical communication with the fuel cell stack 34 to act as a power sink or a power supply to alternatively store or supplement DC power provided by the fuel cell stack 34. The high-voltage battery 76 supplies power to components other than the air pump 56 because the air pump 56 utilizes the low-voltage battery 58. As such, in certain embodiments, this high-voltage battery 76 can be used to provide power to the air compressor 40. A DC-DC boost converter can be positioned between the fuel cell stack 34 and the high-voltage battery 76 to increase a DC voltage level from the fuel cell stack 34 to a higher level suitable for energizing the high-voltage bus and electric devices connected thereto. For instance, when the fuel cell assembly 12 is used to power an alternating current (AC) device such as a polyphase electric machine, the power requirement of the electric machine 18 can exceed the level of output from the fuel cell stack 34. The boost converter thus acts to increase the DC voltage supplied to the electric machine 18, with the high-voltage battery 76 also providing DC power to the electric machine 18 as needed. Additionally, a power inverter module (different from the CPIM 68) can be electrically connected to the high-voltage bus and used to convert the DC voltage on the high-voltage bus to an alternating current voltage (VAC) suitable for energizing phase windings of the electric machine 18, e.g., a traction motor suitable for propelling the vehicle 10. Output torque 28 from the electric machine 18 can be delivered to the output member to perform work aboard the vehicle 10 or other system.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A fuel cell assembly, comprising:
a fuel cell stack;
an air compressor including an on position in which the air compressor is configured to supply air to the fuel cell stack and an off position in which the air compressor does not supply the air to the fuel cell stack, and the air compressor includes a bearing configured to be levitated via air;
an air pump spaced from the air compressor and configured to supply air to the fuel cell stack when the air compressor is in the off position and configured to supply the air to the bearing when the air compressor is in the on position;
wherein the air compressor operates at a first voltage and the air compressor is in electrical communication with the fuel cell stack, and wherein the air pump operates at a second voltage different from the first voltage; and
a battery in electrical communication with the air pump and the battery is configured to provide the second voltage to the air pump.

2. The assembly as set forth in claim 1 wherein:
the air compressor is operable at a high voltage via the fuel cell stack;
the air pump is operable at a low voltage via the battery;
the first voltage is defined as the high voltage and the second voltage is defined as the low voltage; and
the high voltage is greater than the low voltage.

3. The assembly as set forth in claim 1 wherein the second voltage is about 12 volts to about 59 volts, and the first voltage is equal to or greater than 60 volts.

4. The assembly as set forth in claim 1 further including a valve disposed between the air pump and the fuel cell stack, and the valve is disposed between the air pump and the bearing of the air compressor.

5. The assembly as set forth in claim 4 further including a plurality of pathways configured to guide the air, and wherein the valve includes a plurality of positions to open and close the pathways to at least one of the fuel cell stack and the bearing.

6. The assembly as set forth in claim 5 wherein:
the valve is in a first position which allows the air pump to supply the air to the fuel cell stack when the air compressor is in the off position;

the first position of the valve opens one of the pathways between the air pump and the fuel cell stack, and closes another one of the pathways between the air pump and the bearing;
the valve is in a second position which allows the air pump to supply the air to the bearing of the air compressor when the air compressor is in the on position; and
the second position of the valve opens the pathway between the air pump and the bearing, and closes the pathway between the air pump and the fuel cell stack.

7. The assembly as set forth in claim 6 wherein the valve is in a third position which allows the air pump to supply the air to both the fuel cell stack and the bearing of the air compressor when the air compressor switches between the off position and the on position, and wherein the third position of the valve opens the pathway between the air pump and the bearing, and opens the pathway between the air pump and the fuel cell stack.

8. The assembly as set forth in claim 1 wherein the air compressor includes a motor and a shaft rotatable during operation of the motor, and wherein the bearing supports the shaft.

9. The assembly as set forth in claim 1 further including a filter configured to filter the air directed toward the air pump and the air compressor, and further including a silencer disposed between the filter and the air pump, and the silencer is disposed between the filter and the air compressor.

10. The assembly as set forth in claim 1:
wherein the fuel cell stack is disposed downstream from the air pump and the air compressor, and the fuel cell stack includes fuel cells arranged between respective anode and cathode plates;
wherein the air compressor operates at a high voltage and wherein the air compressor is in electrical communication with the fuel cell stack, and wherein the air pump operates at a low voltage different from the high voltage, and the battery is configured to provide the low voltage to the air pump;
further including a valve disposed upstream from the fuel cell stack, and the valve is disposed between the air pump and the fuel cell stack, and the valve is disposed between the air pump and the bearing of the air compressor;
further including a plurality of pathways configured to guide the air, and wherein the valve includes a plurality of positions to open and close the pathways to at least one of the fuel cell stack and the bearing;
wherein the valve is in a first position which allows the air pump to supply the air to the fuel cell stack when the air compressor is in the off position;
wherein the first position of the valve opens one of the pathways between the air pump and the fuel cell stack, and closes another one of the pathways between the air pump and the bearing;
wherein the valve is in a second position which allows the air pump to supply the air to the bearing of the air compressor when the air compressor is in the on position;
wherein the second position of the valve opens the pathway between the air pump and the bearing, and closes the pathway between the air pump and the fuel cell stack;
wherein the air compressor includes a motor and a shaft rotatable during operation of the motor, and wherein the bearing supports the shaft; and further including a filter configured to filter the air directed toward the air pump and the air compressor, and further including a silencer disposed between the filter and the air pump, and the silencer is disposed between the filter and the air compressor.

11. A vehicle comprising:
a propulsion system;
a fuel cell assembly configured to provide power to the propulsion system in at least one mode, and wherein the fuel cell assembly includes:
   a fuel cell stack;
   an air compressor including an on position in which the air compressor is configured to supply air to the fuel cell stack and an off position in which the air compressor does not supply the air to the fuel cell stack, and the air compressor includes a bearing configured to be levitated via air;
   an air pump spaced from the air compressor and configured to supply air to the fuel cell stack when the air compressor is in the off position and configured to supply the air to the bearing when the air compressor is in the on position;
   wherein the air compressor operates at a first voltage and the air compressor is in electrical communication with the fuel cell stack, and wherein the air pump operates at a second voltage different from the first voltage; and
   a battery in electrical communication with the air pump and the battery is configured to provide the second voltage to the air pump.

12. The vehicle as set forth in claim 11 wherein the air compressor is in the on position to supply the air to the fuel cell stack when the fuel cell assembly is in a first power operation mode, and the air pump is configured to supply the air to the fuel cell stack when the fuel cell assembly is in a second power operation mode, and wherein the second power operation mode utilizes less power than the first power operation mode, and the air compressor is in the off position when the fuel cell assembly is in the second power operation mode.

13. The vehicle as set forth in claim 12 further including an accelerator configured to communicate with the propulsion system an amount of acceleration to propel the vehicle, and wherein the fuel cell assembly is in the first power operation mode when a first threshold of the amount of acceleration is reached.

14. The vehicle as set forth in claim 12 wherein the fuel cell assembly is in the second power operation mode during idling of the propulsion system.

15. The vehicle as set forth in claim 12 wherein the fuel cell assembly is in the second power operation mode when less than ten percent of the power of the fuel cell assembly is being utilized.

16. The vehicle as set forth in claim 11 wherein:
the fuel cell assembly further includes a valve disposed between the air pump and the fuel cell stack, and the valve is disposed between the air pump and the bearing of the air compressor; and
the fuel cell assembly further includes a plurality of pathways configured to guide the air, and wherein the valve includes a plurality of positions to open and close the pathways to at least one of the fuel cell stack and the bearing.

17. The vehicle as set forth in claim 16 wherein:
the valve is in a first position which allows the air pump to supply the air to the fuel cell stack when the air compressor is in the off position;
the first position of the valve opens one of the pathways between the air pump and the fuel cell stack, and closes another one of the pathways between the air pump and the bearing;
the valve is in a second position which allows the air pump to supply the air to the bearing of the air compressor when the air compressor is in the on position; and
the second position of the valve opens the pathway between the air pump and the bearing, and closes the pathway between the air pump and the fuel cell stack.

18. A fuel cell assembly, comprising:
a fuel cell stack;
an air compressor including an on position in which the air compressor is configured to supply air to the fuel cell stack and an off position in which the air compressor does not supply the air to the fuel cell stack;
wherein the air compressor includes a bearing configured to be levitated via air;
an air pump spaced from the air compressor and configured to supply air to the fuel cell stack when the air compressor is in the off position and configured to supply the air to the bearing when the air compressor is in the on position;
wherein the air compressor operates at a first voltage and the air pump operates at a second voltage different from the first voltage;
wherein the fuel cell stack is configured to provide the first voltage to the air compressor; and
a battery configured to provide the second voltage to the air pump.

19. The assembly as set forth in claim 18:
wherein the fuel cell stack is configured to provide the first voltage to the air compressor; and
further including a battery configured to provide the second voltage to the air pump.

20. The assembly as set forth in claim 18 wherein:
the first voltage is defined as a high voltage;
the second voltage is defined as a low voltage; and
the high voltage is greater than the low voltage.

* * * * *